Sept. 15, 1970

K. POPPER ET AL

3,528,912

REGENERATION OF ION EXCHANGERS

Filed Nov. 5, 1969

K. POPPER, W.M. CAMIRAND,
F.P. BOYLE.

INVENTORS

BY R. Hoffman & W. Takacs

ATTORNEYS

United States Patent Office 3,528,912
Patented Sept. 15, 1970

3,528,912
REGENERATION OF ION EXCHANGERS
Karel Popper, Danville, Wayne M. Camirand, Albany, and Frank P. Boyle, Lafayette, Calif., assignors to the United States of America as represented by the Secretary of Agriculture
Filed Nov. 5, 1969, Ser. No. 874,166
Int. Cl. B01d 15/06
U.S. Cl. 210—34    5 Claims

ABSTRACT OF THE DISCLOSURE

The conventional method for regenerating spent cation exchange material yields an effluent which presents a disposal problem because of its content of sodium and chloride ions. Novel methods are herein described for obviating this disposal problem. By these methods the effluent is reclaimed or regenerated so that it can be recycled for treating further quantities of spent cation exchange material.

---

A non-exclusive, irrevocable, royalty-free license in the invention herein described, throughout the world for all purposes of the United States Government, with the power to grant sublicenses for such purposes, is hereby granted to the Government of the United States of America.

This invention relates to and has among its objects the provision of novel processes for regenerating ion exchangers. Further objects of the invention will be evident from the following description wherein parts and percentages are by weight unless otherwise specified.

Figure 1:
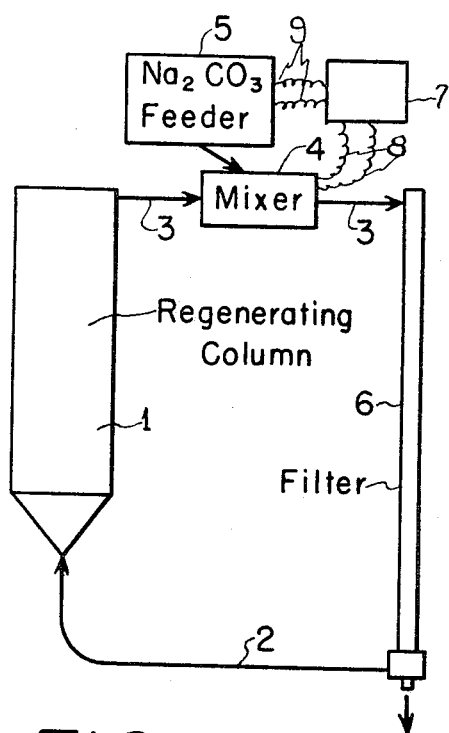
Figure 2:
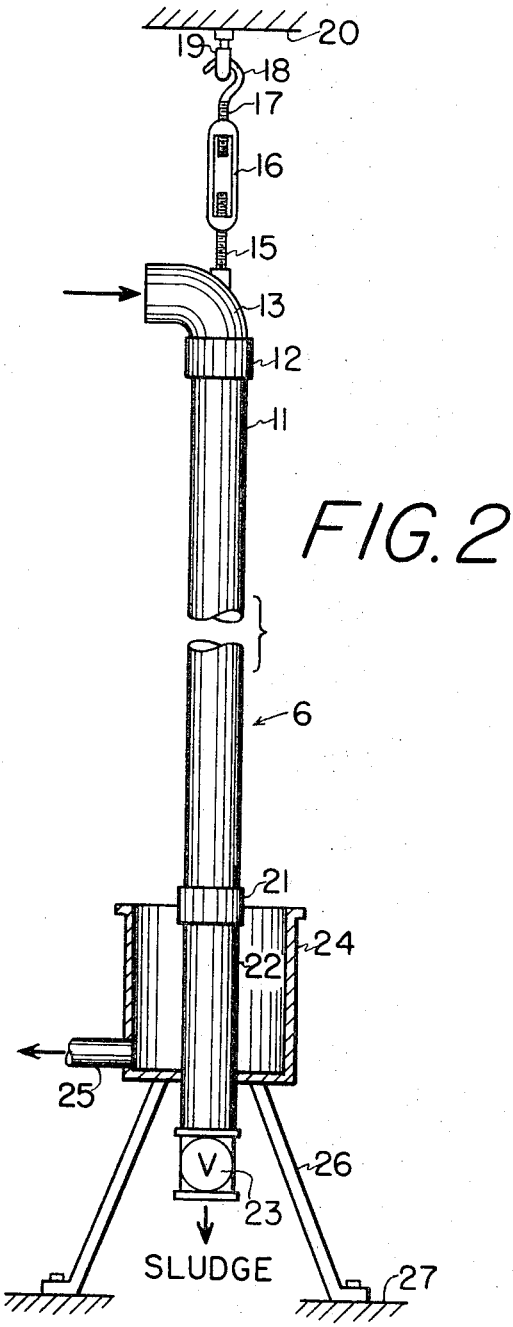

In the annexed drawing, wherein like numerals represent like parts, FIG. 1 is a flow-sheet illustrating the process of the invention; FIG. 2 depicts the filtration apparatus used in a practice of the invention. To reduce the size of FIG. 2, a portion of hose 11 has been omitted.

It is common practice to utilize beds of cation exchange resins to soften water for household and industrial purposes. The bed is exhausted when most of the resin has been converted from the sodium form to the alkaline earth metal form (usually the calcium and/or magnesium form). To regenerate the ion exchanger a solution of a sodium salt (usually sodium chloride) is passed through the bed until the exchanger is reconverted into the sodium form. This regeneration procedure yields a large volume of an effluent containing not only the released Ca and Mg ions but also residual Na ions because the regenerating solution must contain an excess of sodium ions to drive the reaction in the desired direction.

The disposal of the regeneration effluent presents a serious problem, particularly because of its content of sodium and chloride ions. For example, if this effluent is discharged into a site from which it can enter into wells or streams used for irrigation, the quality of water from such source will be decreased, and in severe cases the water will actually cause deterioration of the soil to which it is applied so that it will no longer produce satisfactory crops. In addition to the effect on soil, sodium and chloride ions have been shown to exert a specific toxicity on certain plants. Almonds may develop tipburn and avocados a leaf scorch due to excessive sodium. Among the crops that are sensitive to chloride ion are peaches and other stone fruits, pecans, some citrus varities, avocados, and some grapes. Because of the present emphasis by federal, state, and local governments on pollution control, processors who rely on the procedure in question are facing a crisis—they must devise a disposal system which not only meets anti-pollution standards, but also does the job economically. A failure to meet these criteria means that the operations must be shut down.

A primary object of the invention is the provision of regenerating methods which obviate the problems outlined above. A particular feature of the invention is the elimination of the conventional step of discarding the regeneration effluent. Instead, a procedure is employed wherein this regeneration effluent is itself regenerated so that it is useful for regenerating another batch of spent ion exchange material. As a consequence, the process of the invention does not yield a waste material containing sodium and chloride ions. It yields as a waste, a water-insoluble residue containing mostly calcium and magnesium carbonates which offers no problem in disposal—it is not harmful to animal or plant life. Indeed, it may be used to increase the water permeability of clay soils.

The practice of the invention is now described in detail, having reference to FIG. 1 of the annexed drawing. The spent cation exchange material—i.e., one largely in the alkaline earth metal form—is contained in column 1. An aqueous regenerating liquid is pumped into column 1 via pipe 2. This liquor contains sodium ions, supplied mainly by its content of dissolved sodium chloride. In general, the liquor will contain sodium chloride in a concentration about from 0.2 to 20%. Within this range the more dilute concentrations are preferred as they are less likely to cause distortion or rupture of the cation exchange particles. In column 1 the usual metathesis occurs, the calcium and magnesium forms of the cation exchanger being converted into the sodium form. A feature of the invention is that the regenerating liquid is directed upwardly through the bed of cation exchanger in column 1. This procedure has the following significance: Insoluble compounds—e.g., magnesium carbonate, magnesium hydroxide, calcium carbonate, etc.—may be formed during regeneration, particularly if the liquor is alkaline and especially if it contains carbonate ions in solution. When the flow is upward, the fine particles of these insoluble compounds are entrained in the liquor, carried out of the bed, and eventually removed from the liquor when it passes through filter 6. The net result is that no clogging of the bed occurs. If, however, the flow were to be downward, the particles of these insoluble calcium and magnesium compounds would be trapped within the bed so that flow of liquid therethrough would be impaired and the regeneration could not be carried out properly.

The liquor which leaves the top of column 1 is pumped via pipe 3 into mixer 4. Concomitantly, a concentrated solution of sodium carbonate is introduced into mixer 4 by feeder 5. The amount of sodium carbonate added is correlated with the amount of alkaline earth metal ions in the effluent so that the entire content of dissolved alkaline earth metals is converted into the insoluble compounds—primarily their carbonates, and the hydroxide in the case of magnesium.

The effluent is then pumped through filter 6 wherein the insoluble suspended alkaline earth metal compounds are removed. (Detailed information on the manner in which this filtration is carried out is provided in a subsequent portion of this description.) The filtrate now replenished with sodium ions—derived from the added $Na_2CO_3$—flows into pipe 2 by which it is recycled back to column 1 for effecting a further regeneration of the cation exchanger contained therein.

The treatment as above described is continued until the cation exchange material in column 1 has been completely converted into the sodium form. The insoluble material—largely magnesium and calcium carbonates, and some magnesium hydroxide—removed from the liquor by filter 6 is discarded.

As above noted, the amount of sodium carbonate fed into mixer 4 is to be correlated with the amount of calcium and magnesium ions in the liquor flowing through pipe 3. The stoichiometrical relationship is shown by equations:

$$Ca^{++} + Na_2CO_3 \rightarrow 2Na^+ + CaCO_3$$
$$Mg^{++} + Na_2CO_3 \rightarrow 2Na^+ + MgCO_3$$

The desired correlation may be provided in various ways. For example, the liquor flowing through pipe 3 may be contacted with a conventional device which is capable of sensing the concentration of calcium and magnesium ions in the flowing stream. The signal yielded by this sensor is then applied to control feeder 5 so that it will introduce the amount of sodium carbonate needed to form the alkaline earth metal carbonates. In the alternative, we may operate by pH control. In this case, mixed 4 is provided with a pH sensor which in turn is operatively connected with feeder 5 so that sodium carbonate is introduced at such a rate that the pH of the liquor is adjusted to a level slightly above neutrality, i.e., about 7.5 to 8.5. This will ensure the presence of more than enough sodium carbonate to precipitate the dissolved calcium and magnesium, the former as the carbonate, the latter as the carbonate and hydroxide.

Generally, the filtered liquor leaving filter 6 for return to column 1 will have an alkaline pH, and this is particularly the case where the feeding of $Na_2CO_3$ is accomplished by the pH adjustment method described above. Such alkalinity of the recycling liquor does not interfere with the process. The desired regeneration of the cation exchanger takes place properly. Moreover, if any insoluble compounds such as magnesium hydroxide are formed within the bed, they are entrained in the upwardly flowing stream of regenerating liquor and swept out of the bed so that no clogging occurs. Accordingly, it may be noted at this point that a special feature of our invention is the ability to recycle the reclaimed liquor in its alkaline condition. This, of course, is a substantial advantage since if the pH of the reclaimed liquor were to be reduced, it would require added expense for acid and for equipment to meter the acid into the steam.

Another important feature of the invention is that the process is carried out at ambient (room) temperature. This provides a considerable saving in cost of the operation as no heat exchangers nor fuel are needed to accomplish any of the steps of the process including the contact of the regenerating liquor with the cation exchanger, the incorporation of sodium carbonate, and even the filtration. Moreover, our process is truly continuous in that no holding periods or delays are involved. The recirculating liquor flows from one step to the other directly and without delay. Particularly significant in this regard is that after incorporation of $Na_2CO_3$ in mixer 4 the liquor is immediately fed into filter 6.

Chemists are well aware of the fact that difficulties are encountered when it is attempted to filter liquors containing precipitated alkaline earth metal compounds such as hydroxides. This is particularly true where the precipitates are freshly-formed at ambient temperatures. Magnesium hydroxide is especially notorious in its filtration properties because it is a gelatinous material with an exceedingly slow settling rate and which clogs filter pores so that filtration is rendered slow and inefficient. These problems are overcome in accordance with the invention by the use of a special filtering technique. By using this technique the insoluble alkaline earth metal compounds are separated from the liquor effectively and efficiently even though the insoluble compounds are in a freshly-precipitated state and even though the liquor is at ambient temperature.

For achieving these valuable results we employ the filter disclosed and claimed in the copending application of Wayne M. Camirand and Karel Popper, Ser. No. 766,696 filed Oct. 11, 1968. A particular advantage of this device and one that makes it especially suitable for the purposes of this invention is that it embodies what may be termed a uniflow principle, i.e., the slurry to be filtered, the filtrate, and the thickened residue (filter cake) all flow in one and the same direction—downwardly. In this way the flow of each material involved in the operation complements—and even assists—the flow of the other materials. The net result is that high filtration rates are achieved and the apparatus operates successfully on slurries—such as freshly-precipitated alkaline earth metal carbonates and hydroxides—which are exceedingly difficult to handle in known filtration devices. For example, with conventional plate-and-frame filters one must precoat the filter surfaces with diatomaceous earth or other filter aid in order to be able to handle a freshly-precipitated inorganic hydroxide. With the apparatus of the invention the use of filter-aids is unnecessary; inorganic carbonates and hydroxides can be filtered directly even if they are freshly-precipitated. Contributing to the superior results obtained with our device is that solids can readily settle in the filtration chamber. Indeed, such action is enhanced by the downward movement of the incoming material to be filtered. Moreover, because of this settling action and downward movement of the incoming slurry, the filter surfaces are continuously scavenged, or swept so that there is no build-up of deposits which might hinder the passage of liquid through the filter surfaces.

Another important feature of the said filtering device is that the filter chamber (the flexible foraminous hose 11) provides an unobstructed, straight-line passageway from its inlet to its outlet. This type of construction yields significant advantages. The flow of liquids is not hampered so that the entire length of the filter chamber is available for filtration (movement of liquid through the foraminous wall of the chamber) and for downward flow of thickened slurry within the chamber. Moreover, with this type of construction, thickened slurry can be flushed out of the chamber very effectively. On the other hand, it can be readily visualized that with known devices which utilize filter chambers that are labyrinthine, convoluted, looped, or otherwise providing a devious passageway, there will necessarily be areas of restricted flow and even stagnacy with the result that deposits will build up in these areas whereby the surface available for filtration will be reduced and the system will become choked so that thickened slurry cannot be effectively flushed out of the chamber.

Contrary to many types of conventional filters, the device in question does not employ any vacuum-producing equipment or any vacuum-retaining compartments. Thereby the filter offers the advantages of simplicity and savings in initial and operating costs. The force for effecting the movement of liquid through the foraminous wall and for flushing out thickened material is obtained by pumping the slurry into the foraminous hose and by utilizing the head created by the column of liquid within the hose. Because of this use of a positive pressure system, there is no need for any complex rigid structural arrangement as would be required in a vacuum system; the foraminous hose is inherently capable of resisting high pressures even though made of flexible material.

The filter and the manner in which it is employed in a practice of this invention are next described in detail, having reference to FIG. 2 in the annexed drawing. Flexible hose 11 forms the filter chamber of the device. This hose has a foraminous wall so that liquid from the slurry to be filtered will pass through the wall, whereas solids will be retained within the hose. Excellent results have been attained employing, as hose 11, commercially-available canvas hose sold in nursery supply houses as garden trickling hose. It is obvious, however, that other types of liquid-permeable hoses can be used such as those made from nylon, polyester fibers, polypropylene fibers, glass fibers, etc. To provide an extensive surface area for filtration and to minimize the distance that particles have to travel to reach the foraminous wall, the length of hose 11 should be at least 25 times, preferably at least 100 times, the diameter of the hose.

At its upper end, hose 11 is connected via coupling 12 to feed pipe 13. The slurry to be filtered is introduced under pressure into feed pipe 13 (which communicates with conduit 3, shown in FIG. 1).

To support hose 11 there is provided an arrangement of: threaded rod 15 attached to feed pipe 13; turnbuckle 16; and threaded rod 17 ending in hook 18. Hook 18 is engaged with eye 19 fastened to ceiling 20, or other supporting structure.

At its lower end, hose 10 is connected to discharge pipe 22 via coupling 21.

A valve 23 is provided at the base of discharge pipe 22 for elimination of thickened matter which accumulates in pipe 22 and in the lower portion of hose 11. Valve 23 is preferably of the type which when open provides a passageway of essentially the same cross-section as that of hose 11. In this way a good sweeping-out of thickened material is attained and there is no possibility of building up any dense masses in pipe 22 or hose 11 which might impede action of the device. Taking this matter into account, as valve 23 one preferably uses a plug valve, butterfly valve, gate valve, or a valve of the iris type.

Fastened to discharge pipe 22 is cylindrical filtrate receiver 24 provided with outlet pipe 25 (which communicates with conduit 2, shown in FIG. 1).

To maintain the lower portion of the device in position, there are provided legs 26 which are fastened at their upper ends to receiver 24 and at their lower ends to floor 27, or other supporting structure. Best results are obtained when hose 11 is constrained so that its axis is plumb. This can easily be arranged by making sure that eye 19 is directly over the center of discharge pipe 22 and by tightening turnbuckle 16 so that hose 11 is maintained as a straight vertical column.

In operation of the device, the slurry to be filtered (that is, the precipitate-containing liquor from mixer 4) is pumped into the top of hose 11. To utilize the full capacity of the filter, the rate of pumping is adjusted so that hose 11 is maintained full (except at the times of periodic flushing). The liquid content of the slurry passes radially through the wall of hose 11 and then flows downwardly along the outside of the hose into receptacle 24 and from there into outlet 25. The residual (water-insoluble) material remaining within hose 11 moves downwardly within the hose, impelled by the continued influx of slurry into the top of the hose. During the operation, valve 23 is operated at periodic intervals to flush out the thickened material which accumulates in discharge pipe 22 and the lower portion of hose 11. Valve 23 may be operated manually or it may be of the solenoid type, activated by a timer or a volume-sensing mechanism programmed to open at intervals to release each time a volume of thickened material which is proportionate to the volume of entering slurry or discharging filtrate. Valve 23 need not necessarily be operated periodically: an alternative plan of operation is to maintain this valve in a partly-opened condition so that the thickened material is discharged continuously, rather than intermittently. In any event, the clarified regenerated liquor discharged through outlet 25 is pumped via pipe 2 (FIG. 1) back to column 1 for further treatment of the cation exchanger contained therein.

Having thus described the invention, what is claimed is:
1. A process for regenerating a cation exchange material which is in the alkaline earth metal form, comprising:
 (a) flowing an aqueous regenerating liquor containing sodium ions upwardly through a bed of the cation exchange material in the alkaline earth metal form,
 (b) collecting the effluent liquor containing dissolved alkaline earth metal ions,
 (c) mixing with the effluent liquor a quantity of sodium carbonate sufficient to precipitate its dissolved alkaline earth metal content,
 (d) without any delay, flowing the resulting liquor containing freshly-precipitated insoluble alkaline earth metal compounds into the top of, and downwardly within, an elongated vertical chamber surrounded by a foraminous wall, whereby filtration of the liquor is effected and thickened insoluble material moves downwardly within the chamber,
 (e) releasing from the bottom of the chamber the thickened material which accumulates thereat,
 (f) collecting the filtrate which passes through the foraminous wall and flows downwardly along the exterior thereof,
 (g) recycling the filtrate to Step (a) to provide the aqueous regenerating liquor of that step, and
 (h) continuing said steps until the cation exchanger is converted to the sodium form.
2. The process of claim 1 wherein each of the steps is conducted at ambient temperatures.
3. The process of claim 1 wherein the recirculating liquor is slightly alkaline.
4. The process of claim 1 wherein the recirculating liquor has a pH of about from 7.5 to 8.5.
5. The process of claim 1 wherein the quantity of added sodium carbonate is that required to provide a pH of about from 7.5 to 8.5.

References Cited

UNITED STATES PATENTS 2,628,165   2/1953   Bliss _____ 210—28 X

SAMIH N. ZAHARNA, Primary Examiner

U.S. Cl. X.R.
210—28, 35